Aug. 10, 1926.
C. H. TAYLOR
PISTON RING
Filed Sept. 26, 1925
1,595,890
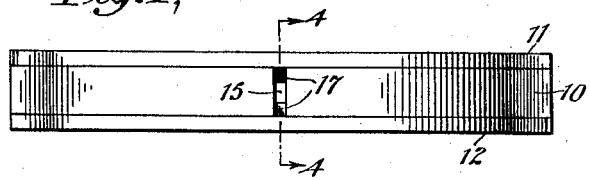
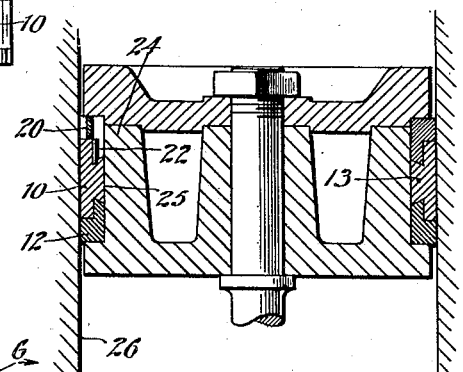
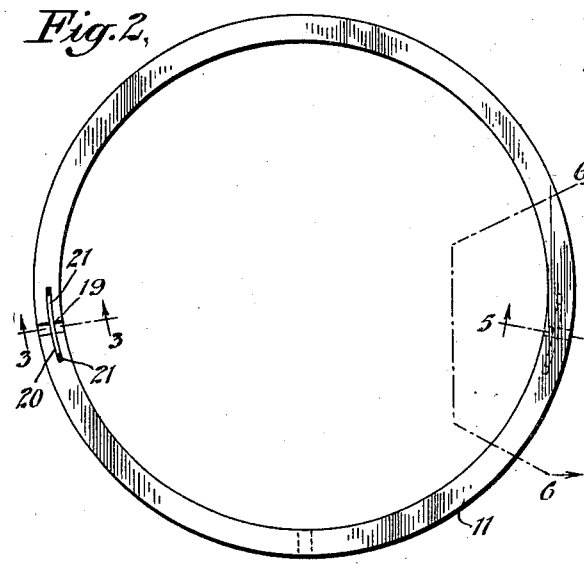
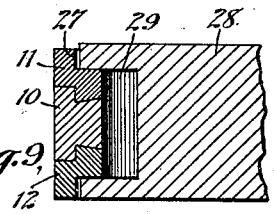
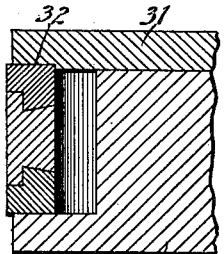
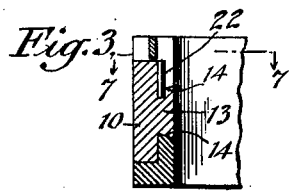
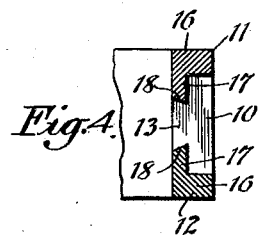
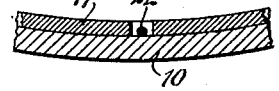
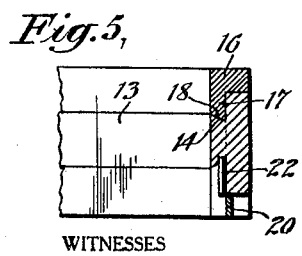
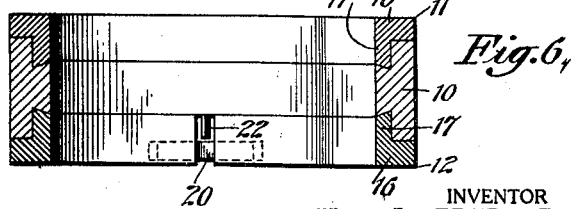
WITNESSES
INVENTOR
Claude H. Taylor
BY
ATTORNEYS Patented Aug. 10, 1926.

1,595,890

UNITED STATES PATENT OFFICE.

CLAUDE HUNTER TAYLOR, OF BILOXI, MISSISSIPPI.

PISTON RING.

Application filed September 26, 1925. Serial No. 58,828.

This invention relates to piston or packing rings, and has particular reference to a ring for use in connection with steam or other fluid pump or valve pistons and plungers, the same being in the nature of an improvement over my prior United States Letters Patent No. 1,538,758, granted to me May 19, 1925.

The present invention comprehends a multiple section piston ring in which means of connection between sections is provided to lock the same together for radial expansion and contraction whereby pressure exerted upon one section will be transmitted to the other sections.

As a further object the invention comprehends a multiple-section piston or packing ring including means or maintaining the split ends of each ring section in circumferential alinement, and which further includes an improved means for positioning and maintaining the split portions of the several ring sections out of circumferential alinement with respect to each other.

The invention furthermore contemplates a piston or packing ring structure of the multiple-section type in which means of connection is provided between the several sections thereof to cause the same to move in unison when radially expanded or contracted, and which prevents relative separation of the sections except upon initial axial separation, whereby when the sections are associated and confined within the ring-receiving groove of the piston or plunger, displacement is positively precluded.

The invention furthermore aims to provide a device of the character set forth which is comparatively simple in its construction, inexpensive to manufacture, and which is highly efficient in its purpose.

With the above recited and other objects in view, reference is had to the accompanying specification and drawings in which there are certain examples or embodiments of the invention which are in no way intended as limitations upon the scope of the appended claims as it is to be clearly understood that variations and modifications which properly fall within the scope of said claims may be resorted to when found expedient.

In the drawings—

Figure 1 is a side view of a piston ring constructed in accordance with the invention;

Fig. 2 is a plan view;

Fig. 3 is a fragmentary transverse sectional view taken approximately on the line 3—3 of Fig. 2;

Fig. 4 is a sectional view taken approximately on the line 4—4 of Fig. 1;

Fig. 5 is a fragmentary sectional view taken approximately on the line 5—5 of Fig. 2;

Fig. 6 is a sectional view taken approximately on the line 6—6 of Fig. 2;

Fig. 7 is a fragmentary sectional view taken approximately on the line 7—7 of Fig. 3;

Fig. 8 is a sectional view illustrating the application of the ring to a piston or plunger;

Fig. 9 is a fragmentary sectional view illustrating a slightly modified adaptation of the invention;

Fig. 10 is a similar view of a further use of the invention.

Referring to the drawings by characters of reference, the piston or packing ring includes an intermediate section designated generally by the reference character 10, and outer sections 11 and 12, which are of substantially identical construction. The intermediate section 10 is formed on its inner periphery with a dovetailed rib 13 presenting inclined or flared opposite faces or sides 14. This intermediate section is split, as at 15, whereby the same is capable of radial expansion and contraction, the same being preferably of a resilient material normally to expand a predetermined degree. The outer sections 11 and 12 include a body 16 and a marginal reduced flange 17 which is designed to fit within the inner periphery of the intermediate ring section on opposite sides of the rib 13, the ends or extremities of said flanges having inclined or beveled complementary faces 18 to interengage with the beveled or inclined opposite faces 14 of the dovetailed rib 13. The outer ring sections 11 and 12 have their bodies and flange portions transversely split, as at 19, to allow for radial contraction and expansion thereof, and when axially assembled in contiguous relation with the intermediate section, the expansion and contraction of the sections in unison are insured and the pressure exerted on one section will be correspondingly transmitted to the other sections due to the interengagement of the beveled faces 14 and 18. In order to maintain the ends of each of the sections 11 and 12 in circumferential alinement while permitting of radial expansion and contraction thereof, a key plate 20 is provided which bridges the transverse split portion thereof with the opposite ends slidably engaged within the circumferential slots 21 formed in the ring sections. In order to provide means for positioning and maintaining the split portions of the section in a non-alined relation, the intermediate section 10 is provided with pins or other similar abutment devices 22 on its inner periphery, and on the opposite sides of the rib 13, which abutment devices or pins are in circumferentially spaced relation for engagement within the split portions 19 of the outermost ring sections 11 and 12.

When the ring is associated with a piston, plunger, or other similar element 24, by positioning the same within the receiving peripheral groove 25 defined therein and arranged within the walls of a cylinder 26, it is obvious that if the width of the groove 25 is substantially the same as the width of the ring, displacement thereof is prevented, while the interengagement of the beveled, flared or inclined faces 14 and 18 insures the expansion and contraction of the ring sections in unison, so that pressures exerted on any one of the ring sections will be transmitted to the others.

As illustrated in Fig. 9, the outer ring sections 11 and 12 may be provided with a rabbeted portion 27, whereby on plungers or pistons 28 of the smaller type, the maximum width of ring may be applied with the reduced portion of the ring fitted within the peripheral receiving groove 29 thereof.

In Fig. 10 there is illustrated a ring constructed in accordance with the preferred form of the invention, as applied to a piston or plunger 30 having a follower plate 31 provided with a rabbeted portion 32.

What is claimed is:

1. A piston ring including intermediate and outer transversely split ring sections, the intermediate section having an inner peripheral dovetailed rib presenting inclined opposite faces, the outer sections each having a marginal reduced flange fitting behind the intermediate section and formed with a complementary inclined free end coacting with the inclined faces of the dovetailed rib to connect the sections for simultaneous radial expansion and contraction.

2. A piston ring including intermediate and outer transversely split ring sections, the intermediate section having an inner peripheral dovetailed rib presenting inclined opposite faces, the outer sections each having a marginal reduced flange fitting behind the intermediate section and formed with a complementary inclined free end coacting with the inclined faces of the dovetailed rib to connect the sections for simultaneous radial expansion and contraction, said ring adapted to be fitted within a groove of a width equal to the combined widths of the ring sections when assembled, whereby to prevent axial relative movement thereof and consequent disengagement of the inclined faces of the dovetailed rib and flanges.

CLAUDE HUNTER TAYLOR.